US008400098B2

(12) United States Patent
Ewert et al.

(10) Patent No.: US 8,400,098 B2
(45) Date of Patent: Mar. 19, 2013

(54) DEVICE AND METHOD OF DETERMINING AND DEFINING A TRAVEL PROFILE OF A TIME-CRITICAL AXLE

(75) Inventors: Stefan Ewert, Graben-Neudorf (DE); Andreas Steinsdörfer, Bruchsal (DE)

(73) Assignee: Sew-Eurodrive GmbH & Co. KG, Bruchsal (DE)

( * ) Notice: Subject to any disclaimer, the term of this patent is extended or adjusted under 35 U.S.C. 154(b) by 602 days.

(21) Appl. No.: 12/439,645

(22) PCT Filed: Aug. 27, 2007

(86) PCT No.: PCT/EP2007/007481
§ 371 (c)(1),
(2), (4) Date: Mar. 2, 2009

(87) PCT Pub. No.: WO2008/025499
PCT Pub. Date: Mar. 6, 2008

(65) Prior Publication Data
US 2010/0007302 A1 Jan. 14, 2010

(30) Foreign Application Priority Data

Sep. 1, 2006 (DE) .......................... 10 2006 041 288
Apr. 28, 2007 (DE) .......................... 10 2007 020 184

(51) Int. Cl.
*G05B 11/32* (2006.01)
(52) U.S. Cl. ...................................................... 318/625
(58) Field of Classification Search ................... 318/625
See application file for complete search history.

(56) References Cited

U.S. PATENT DOCUMENTS

| 4,518,899 | A | 5/1985 | Wolf | |
|---|---|---|---|---|
| 6,176,341 | B1* | 1/2001 | Ansari | 180/402 |
| 7,395,606 | B2* | 7/2008 | Crampton | 33/503 |
| 7,437,201 | B2* | 10/2008 | Cullen | 700/29 |
| 7,669,534 | B2* | 3/2010 | Kumar et al. | 105/35 |
| 2005/0246062 | A1* | 11/2005 | Keibel | 700/245 |

(Continued)

FOREIGN PATENT DOCUMENTS

| DE | 33 09 370 | 9/1984 |
|---|---|---|
| DE | 102 39 047 | 3/2004 |

(Continued)

OTHER PUBLICATIONS

European Patent Office, International Search Report, Nov. 20, 2007, International Patent Application No. PCT/EP2007/007481 filed Aug. 27, 2007.

(Continued)

*Primary Examiner* — Walter Benson
*Assistant Examiner* — Erick Glass
(74) *Attorney, Agent, or Firm* — Kenyon & Kenyon LLP

(57) ABSTRACT

A method for controlling the movement of axles whose drives are connected for exchanging energy, in particular by connecting intermediate circuits of the converters respectively comprised by the drives, prior to the start of the movement, a predictive determination of the sequence of movements being performed, in the process of which first the time-critical axle is determined, then the travel profile of the time-critical axle is defined, then a respective total energy consumption is assigned to the possible travel profiles of additional axles, from these, the profile is selected that has the smallest total energy requirement associated with it, and then the movement is carried out.

13 Claims, 4 Drawing Sheets

U.S. PATENT DOCUMENTS

2007/0272904 A1* 11/2007 Johnston et al. .............. 254/2 R
2009/0021023 A1   1/2009 Freudelsperger

FOREIGN PATENT DOCUMENTS

| | | |
|---|---|---|
| EP | 1 643 630 | 4/2006 |
| JP | 2005 253 213 | 9/2005 |
| WO | WO 2005/117248 | 12/2005 |

OTHER PUBLICATIONS

International Bureau, Translation of International Preliminary Report on Patentability (including Written Opinion of the International Searching Authority), International Patent Application No. PCT/EP2007/007481, Mar. 17, 2009.

* cited by examiner

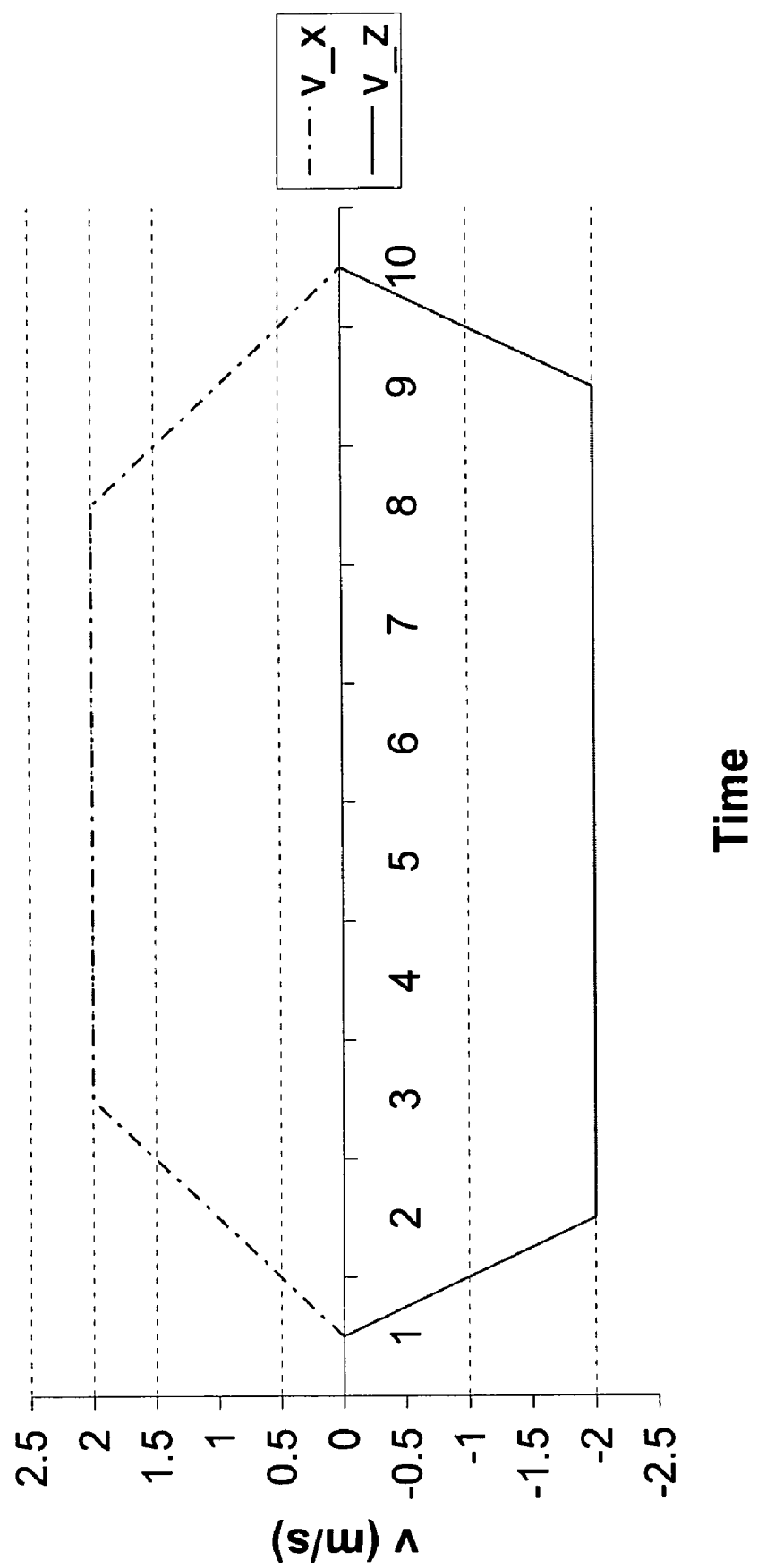

US 8,400,098 B2

DEVICE AND METHOD OF DETERMINING AND DEFINING A TRAVEL PROFILE OF A TIME-CRITICAL AXLE

FIELD OF THE INVENTION

The present invention relates to a method and a device.

BACKGROUND INFORMATION

Electrical drives include an electric motor supplied by a converter, which drives a load directly or via a gear unit.

WO 2005/117248 describes a shelf storage system, in which some individual predefined movement profiles having associated current consumption values or current delivery values are provided. In this instance, the energy fed back into the energy supply circuit is determined (claim 15 of WO 2005/117248).

DE 33 09 370 describes a method for influencing the run up and run down of two asynchronous motors.

SUMMARY

Example embodiments of the present invention make it possible to manufacture systems as compactly and as cost-effectively as possible and to effect energy savings in the process.

Among features in the method for controlling the movement of axles, whose drives are connected for exchanging energy, in particular by connecting intermediate circuits of the converter respectively included by the drives, are that prior to the start of the movement a predictive determination of the sequence of movements is performed, in the process of which first the time-critical axle is determined,
then the travel profile of the time-critical axle is established,
then a respective total energy consumption is assigned to the possible travel profiles of additional axles,
from these, the profile is selected that has the smallest total energy requirement associated with it,
then the movement is carried out.

The total energy is considered to be the energy that is to be supplied via the electrical supply lines to the device comprising the drives for carrying out the movement.

In WO 2005/117248, the energy fed back into the energy supply circuit is determined; but the energy or power supplied via the supply lines of the shelf storage system is not determined. In example embodiments of the present invention, by contrast, the total energy to be supplied is determined and then the minimum is determined.

An advantage of example embodiments of the present invention is that by determining the time-critical axle it is possible to carry out the movement quickly and that it is possible to save energy by the dependent process sequences of the additional axles. Nevertheless, the movement is not slowed down, but is rather carried out as quickly as possible, the movement in this instance concerning not only one, but multiple axles in mutual dependence.

In example embodiments, the time interval associated with the movement for the respective additional axles and their travel profile, in particular including associated acceleration values and braking acceleration values, is determined such that the required peak power for the movement, supplied via the energy supply lines from the drives connected for energy exchange, is as low as possible, in particular minimal. Thus, advantageously, only a low power needs to be supplied. In particular, the greatest power to be supplied while the movement is carried out, that is, the peak power, is as low as possible. This allows for thin wires and thus cost-effective cables as electrical supply lines for the device operated in accordance with example embodiments of the present invention. Thus, not only is the total energy consumption kept at a minimum, but also the total peak power to be supplied to the device from outside is kept low. This then entails structural advantages such as commensurately thin conductor cross sections and electrical and electronic components that may be dimensioned to be commensurately small. This also applies, for example, to rectifier diodes for producing the unipolar intermediate circuit voltage or line reactors for damping harmonic oscillations.

Example embodiments of the present invention also take into account the friction losses, which also depend on the speed of the respective axle. In particular, the friction losses are reduced when the speed is reduced. Thus it is advantageous to reduce the speed of the additional axles that are not time-critical. For this purpose, however, the motive operation of the additional axles is implemented primarily such that the additional axles are able to consume as much energy as possible from the regenerative operation of the time-critical axle.

The advantage is that the energy produced by one axle in the regenerative operating mode may be supplied to other axles. Thus the total energy consumption in the movement is reduced.

Example embodiments provide for the movement from an initial state, in particular an initial position, to a final state, in particular a final position. An advantage is that the positioning movements may be carried out in an energy-saving manner in the shortest time.

In example embodiments, the time interval associated with the movement for the respective additional axles is provided such that at least one time range is included, in which the time-critical axle is decelerated, that is, that in particular a braking acceleration of the time-critical axle is provided. An advantage is that the additional axles may consume the energy recovered from the time-critical axle. Thus, only a low peak power is required.

In example embodiments, the travel profile is determined for the time-critical axle using the maximum acceleration and braking acceleration. An advantage is that using the time-critical axle it is possible to perform the fastest movement possible.

In example embodiments, the additional axles are operated at least when the time-critical axle is operated in a regenerative manner. An advantage is that the regeneratively produced energy of the time-critical axle may be consumed by the additional axles.

Moreover, in the regenerative operation of the additional axle it is also possible to supply energy to the time-critical axle, which in this period is operated motively.

In example embodiments, the additional axles are operated at a speed reduced with respect to the maximum permissible speed such that they are operated at least during the entire time span during which the time-critical axle is operated regeneratively. An advantage is that at a reduced speed the friction losses are reduced and thus it is possible to save energy.

Among features of example embodiments of the present invention in the device are that the device includes drives driving axles, which include converters respectively comprising at least one intermediate circuit, the intermediate circuits of the converters are connected with one another for exchanging energy, at least one computer being provided, which includes a device for predictively determining the axle movement, the computer in particular also including a device for determining a total energy-optimized movement of the axles.

An advantage is that by the prediction and consideration of the facilitated energy exchange, the movement may be carried out in an energy-saving manner without increasing the time requirement.

In example embodiments, the device includes a computer, in particular a control system for precalculating path lines, in particular for precalculating and controlling the drives in mutual dependence in the movement. A feedback about the axle movement is dispensable in an appropriate refinement of the device. An advantage is that no central SPS, but a decentralized arrangement of the computing capacity is made possible because only the path must be controlled in mutual dependence. Of course, a general command from a higher-order control system and/or SPS may additionally be taken into account.

In example embodiments, the computer and the drives may be provided for carrying out a master-slave regulation, the time-critical axle being provided as master and additional axles as slave. An advantage is that no time losses arise because the slave is controllable as a function of the master drive.

In example embodiments, the computer is provided as integrated in one of the converters. An advantage is that no separate computer is required and thus housings may be reduced.

In example embodiments, the device is a shelf operating device, in particular having at least one drive for a hoisting gear and another drive for moving the main vehicle comprising the hoisting gear. An advantage is that the energy consumption of the device is decreased and thus the energy supply lines of the device may be designed for correspondingly smaller capacities. This makes it possible, for example, to improve the utilization of a collector wire or even to use a system for a contactless supply of energy to the main vehicle, the energy being supplied via an inductive coupling.

LIST OF REFERENCE NUMERALS 1 time-critical axle x
2 additional axle z

DETAILED DESCRIPTION

Example embodiments of the present invention are explained in greater detail with the aid of the figures.

Example embodiments of the present invention may be applied in a machine or facility that has at least two drives that are in particular movable in mutual dependence.

For example, if the first drive drives a first axle of the machine and the second drives a second axle, then there is frequently the task of moving from an initial state (x1,y1) to a final state (x2,y2), x1 being the initial position of the first axle and x2 being the final position of the first axle, and y1 the initial position of the second axle and y2 the final position of the second axle.

The axle is driven by an electric motor, which may be comprised by an electrical drive, and is implemented either as a rotational or a linear axle.

A maximum acceleration is assigned to each drive.

One of the drives is the time-critical one, depending on state values. This means that the period of time required by the associated axle to get from the initial position to the final position determines the period of time from the initial state to the final state of the machine. The maximum acceleration, speed and braking acceleration are provided.

This is illustrated in FIG. 1, where speed is plotted against time. In this instance, axle x is the time-critical axle. It is started at the maximum permissible acceleration until the maximum permissible speed is reached. The maximum permissible braking acceleration is applied for braking.

The additional axle is moved in an energy-optimized manner. This means that the acceleration value and the braking acceleration are chosen such, namely, in such a time interval, that the total power consumption is as small as possible. This makes it possible to utilize energy produced regeneratively when braking the x axle for moving the z axle.

Advantageously, for this purpose, the intermediate circuits of the drives are connected to one another for exchanging energy. For this purpose, each converter of the respective drive has a rectifier for producing a unipolar voltage from the line voltage supplying the converter, the unipolar voltage being the intermediate circuit voltage and being applied on a capacitor. This intermediate circuit voltage is then supplied to the output stage, which comprises electronic power switches that are controllable by a control electronics of the converter.

Thus, in example embodiments of the present invention, the intermediate circuit of a first converter is connected to that of a second and energy may be exchanged.

FIG. 1 shows that the energy fed into the intermediate circuit when the x axle is decelerated is used for moving the z axle. Since the travel path of the z axle is less than half as long as the travel path of the x axle, the z axle is started only after traversing half of the path of the x axle.

If the travel path of the z axle were much shorter, then time intervals of varying length for the z axle would be possible, and the one that would be chosen would be the one that would have the lowest power consumption, friction being taken into account for this purpose. This then results in a travel that is as slow as possible.

Thus it is provided to minimize the energy for the travel process consumed as a whole by all energy-coupled converters.

The axles x and z may also be the travel axle and lift axle of a shelf operating device that comprises a travel drive for the entire vehicle and a lift drive for a vertical conveyor.

FIG. 2 shows the case in which a lift axle—in this case the z axle—is reduced, and the x axle as the travel axle is raised. In this instance, the vehicle is moved by the x axle, that is, initially accelerated, and decelerated in the end. The x axle is time-critical in this instance. An energy-optimized result is then achieved if the z axle is reduced preferably during the entire travel time of the x axle.

FIG. 4 shows the case in which the x axle is decelerated slowly, that is, using a low braking torque, and the z axle as the time-critical axle is decelerated at the maximum permissible braking torque. In this instance, the z axle, prior to initiating its braking process, takes on energy from the x axle, because the braking process of the x axle sets in earlier.

Figure 1:
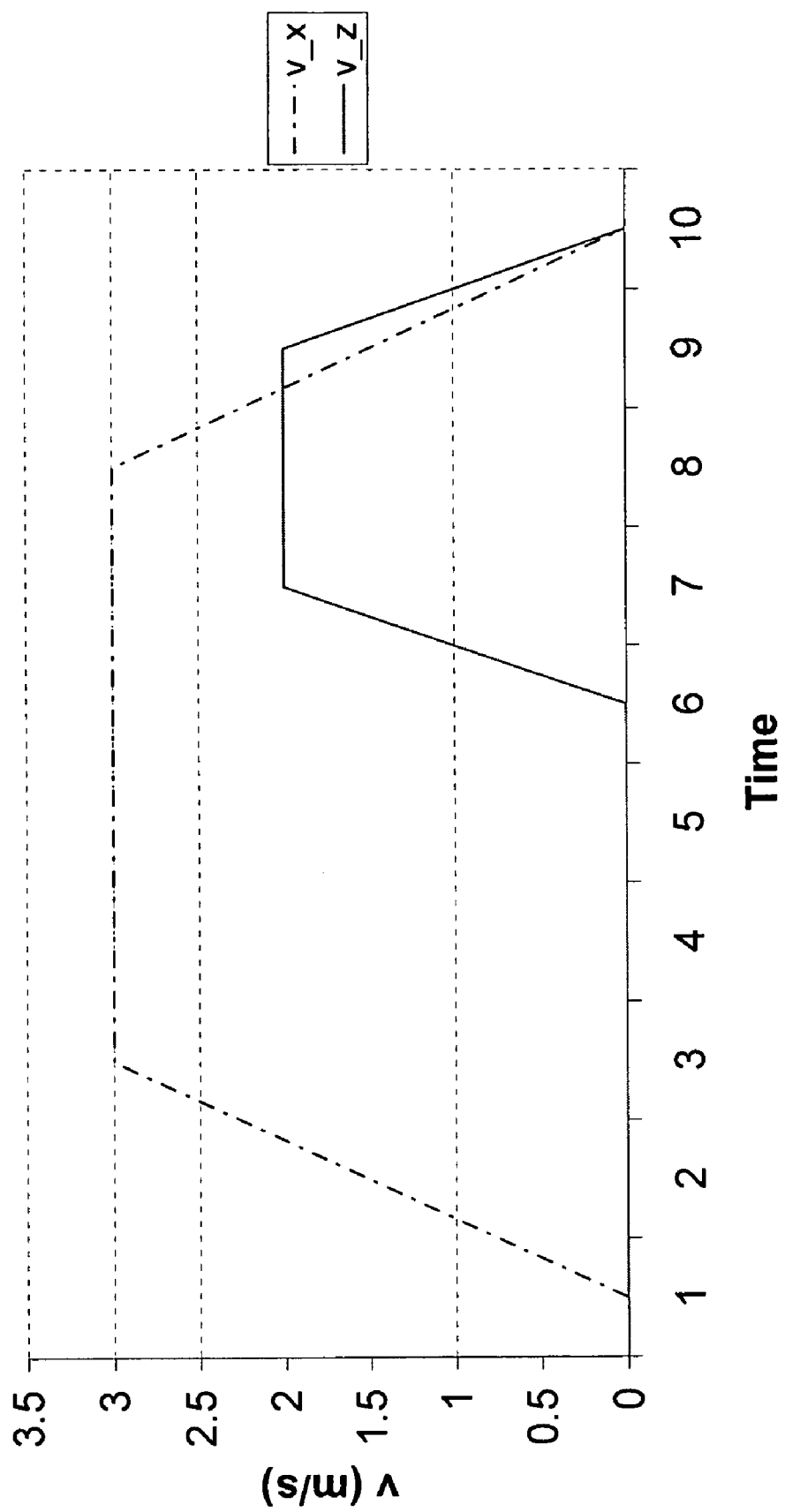
Figure 2:
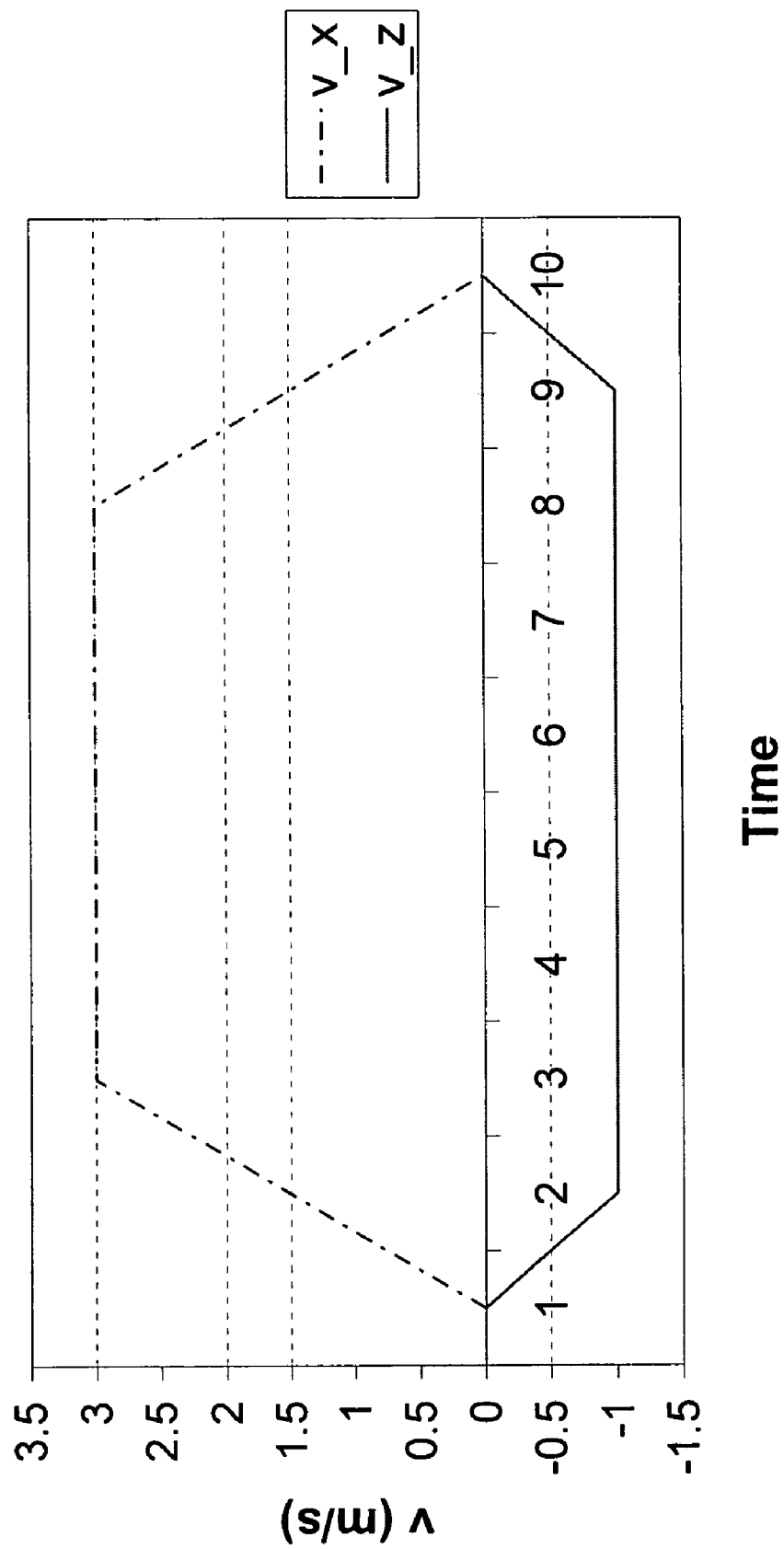
Figure 3:
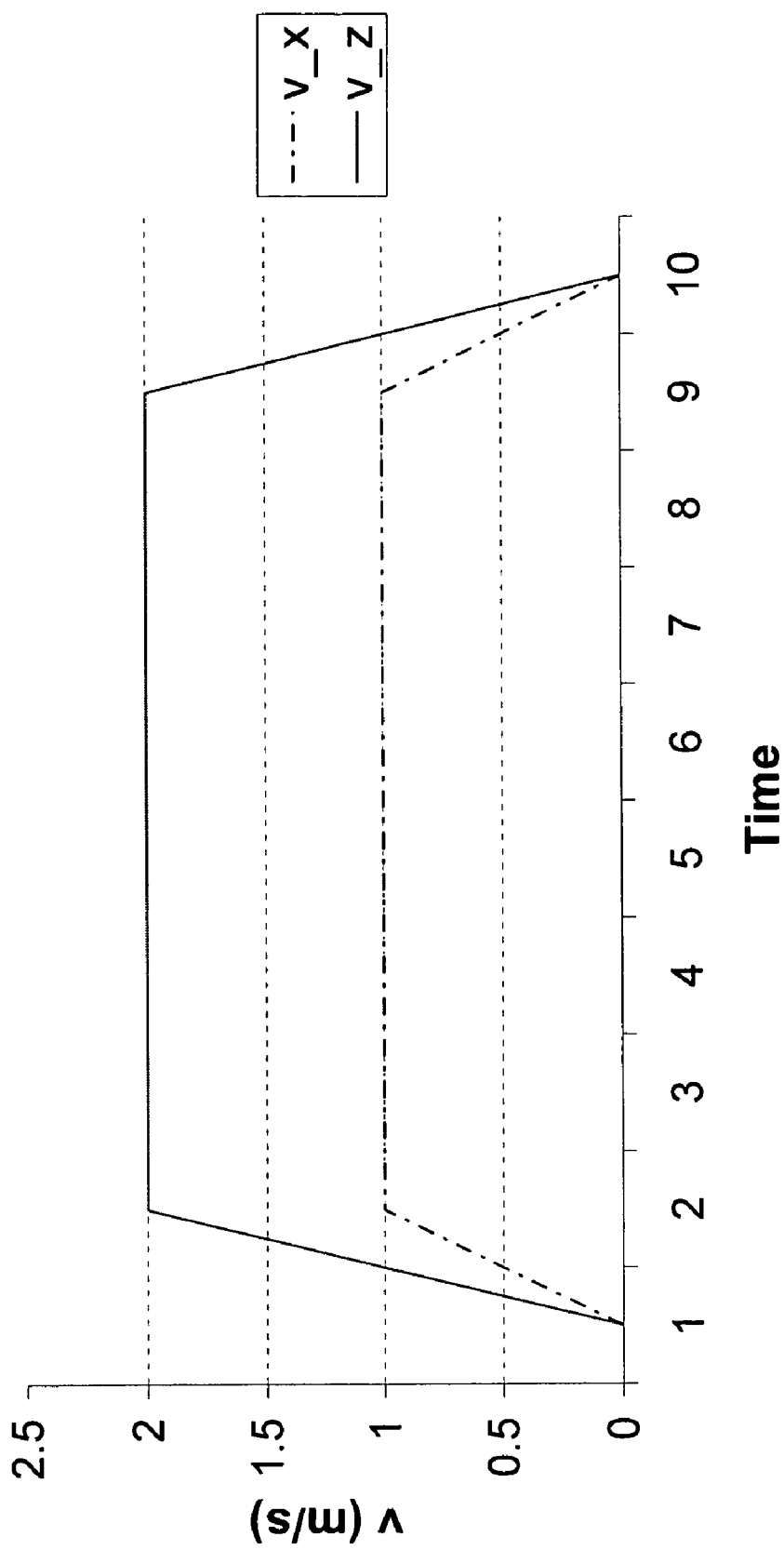
FIG. 3 shows the case in which the z axle is the time-critical axle and the x axle is moved at a reduced speed in order to reduce the friction losses and in particular when decelerating the z axle to have at least part of the regenerative energy of the z axle be consumed by the x axle. For the latter is operated at a lower braking acceleration than the maximum permissible braking acceleration.

Thus, overall, first the time-critical axle is determined in the present invention and then the fastest possible manner of travel is determined for this axle. Afterwards, the travel profile, in particular the speed profile, for the additional axle is determined, a minimum being selected in the total energy consumption associated with the respective travel profile. Friction losses are also taken into account in the process.

The procedure, however, requires prediction. This means that, prior to carrying out the movement, a computer first makes the mentioned determinations and only then can the movement be started.

By coupling the intermediate circuits, example embodiments of the present invention allow for energy to be exchanged between the converters of the drives. Thus, energy produced by a drive operated in a regenerative operating mode may be transferred to a motively operating drive. The energy otherwise destroyed by braking resistors suppliable from the intermediate circuit is reduced.

In other exemplary embodiments of the present invention, rather than determining all possible travel profiles for the additional axles and then determining their associated total energy, instead the possible travel profiles are equipped with parameters whose value range is defined, that is, the boundary conditions are defined. Exemplary boundary conditions to be mentioned are time ranges for the travel of the additional axles, maximum accelerations, etc. Afterwards, an optimization method is used for determining an at least local optimum in this multi-dimensional parameter space. The optimization is carried out mainly with respect to the total energy. If multiple solutions may emerge, the optimization is also carried out with respect to the smallest possible peak power to be supplied.

In other exemplary embodiments according to the present invention, additional rules are input for the other travel profiles, which are directed to the respective device. Thus the parameter space may be limited further and the optimization may be carried out more simply and more quickly. In particular, not only a local, but also the absolute optimum may be found.

In other exemplary embodiments according to the present invention, a supply module supplies all converters with an intermediate circuit voltage such that the converters require no respective rectifiers for rectifying the line voltage. For one rectifier in the supply module suffices for rectifying the line voltage. In addition, a braking resistor and/or a line recovery unit may be provided in the supply module. Alternatively, the supply module may be equipped with a matrix converter such that it may replace the rectifier and the recovery. In this manner, fewer semiconductor power components are required overall.

The converters are thus substantially designed and/or operated as inverters such that they are capable of providing from the unipolar intermediate circuit voltage the a.c. voltage for supplying the electric motors of the drives.

The device may be, in particular, multi-axially operated shelf operating devices, robots, handling systems or other machines and facilities having multiple axles capable of being operated in mutual dependence.

What is claimed is:

1. A method for controlling movement of axles having drives connected for exchanging energy by connecting intermediate circuits of converters respectively included by the drives, comprising:
   prior to a start of movement, a predictive determination of a sequence of movements is performed, including:
      first determining a time-critical axle;
      then defining a travel profile of the time-critical axle;
      then assigning a respective total energy consumption to possible travel profiles of additional axles;
      selecting a profile that has a smallest associated total energy requirement; and
      then performing the movement.

2. The method according to claim 1, wherein a time interval associated with the movement for the respective additional axles and their travel profile, with associated acceleration values and braking acceleration values, is determined such that a peak power required for the movement, supplied from the drives connected for energy exchange via energy supply lines, is at least one of (a) low and (b) minimal.

3. The method according to claim 1, wherein a time interval associated with the movement for the respective additional axles is provided such that at least one time range is provided, in which at least one of (a) the time-critical axle is decelerated and (b) a braking acceleration of the time-critical axle is provided.

4. The method according to claim 1, wherein the movement is provided to occur from at least one of (a) an initial state and (b) an initial position to at least one of (a) a final state and (b) a final position.

5. The method according to claim 1, wherein the travel profile is determined for the time-critical axle in accordance with a maximum acceleration and a braking acceleration.

6. The method according to claim 1, wherein the additional axles are operated at least when the time-critical axle is operated in a regenerative manner.

7. The method according to claim 1, wherein the additional axles are operated at a reduced speed compared to a maximum permissible speed such that they are operated at least during an entire time span during which the time-critical axle is operated regeneratively.

8. A device, comprising:
   drives adapted to drive axles, each axle including converters having at least one intermediate circuit, the intermediate circuits of the converters connected with one another to exchange energy;
   at least one computer adapted to predictively determine axle movement and to determine a total energy-optimized movement of the axles.

9. The device according to claim 8, wherein further comprising a control system adapted to precalculate and control the drives in mutual dependence in the movement.

10. The device according to claim 8, wherein the computer and the drives are adapted to perform a master-slave regulation, a time-critical axle being provided as master and additional axles as slaves.

11. The device according to claim 8, wherein the computer is integrated in one of the converters.

12. The device according to claim 8, wherein the device is arranged as a shelf operating device having at least one drive for a hoisting gear and another drive for moving a main vehicle having the hoisting gear.

13. The device according to claim 8, wherein the device is adapted to performed a method for controlling movement of the axles having the drives connected for exchanging energy by connecting the intermediate circuits of the converters respectively included by the drives, the method including:
   prior to a start of movement, a predictive determination of a sequence of movements is performed, including:
      first determining a time-critical axle;
      then defining a travel profile of the time-critical axle;
      then assigning a respective total energy consumption to possible travel profiles of additional axles;
      selecting a profile that has a smallest associated total energy requirement; and
      then performing the movement.

* * * * *